(12) United States Patent
Zhang et al.

(10) Patent No.: US 6,459,524 B1
(45) Date of Patent: Oct. 1, 2002

(54) APPARATUS AND METHOD FOR SENSING SWITCHING POSITIONS OF A MEMS OPTICAL SWITCH

(75) Inventors: Nan Zhang, Chanhassen; Hong Zhang, Richfield; Arden L. Olson, Eden Prairie, all of MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

(21) Appl. No.: 09/815,170

(22) Filed: Mar. 22, 2001

(51) Int. Cl.[7] .................. G02B 26/00; G02B 26/08; G02B 6/24; H01L 21/00
(52) U.S. Cl. .................. 359/290; 359/223; 385/18; 438/52; 438/29
(58) Field of Search .................. 359/290, 291, 359/223; 438/52, 57, 29; 385/18, 16

(56) References Cited

U.S. PATENT DOCUMENTS 6,229,640 B1    5/2001  Zhang ........................ 359/290
6,303,885 B1 *  10/2001 Hichwa et al. ............. 200/181
6,360,036 B1 *  3/2002  Couillard .................... 385/19
6,363,183 B1 *  3/2002  Koh ............................ 385/19

FOREIGN PATENT DOCUMENTS

WO    WO-01/50172 A2 *  7/2001  .......... G02B/26/00

* cited by examiner

Primary Examiner—Georgia Epps
Assistant Examiner—David N. Spector
(74) Attorney, Agent, or Firm—Merchant & Gould P.C.

(57) ABSTRACT

A position sensing apparatus, for sensing switching positions in a MEMS device that includes a suspension structure, an actuator, and a support structure, is provided. The apparatus includes a first contact disposed on the suspension structure, a second contact coupled to the support structure, and an indicator coupled to one of the first and second contacts. When the first and second contacts are in contact, the indicator provides a first signal, and when the first and second contacts are not in contact, the indicator provides a second signal.

26 Claims, 7 Drawing Sheets

APPARATUS AND METHOD FOR SENSING SWITCHING POSITIONS OF A MEMS OPTICAL SWITCH

FIELD OF THE INVENTION

The present invention relates to optical microelectromechanical system (MEMS) and, more particularly, to apparatus and method for sensing switching positions of a MEMS optical switch.

BACKGROUND OF THE INVENTION

Modern technology has enabled MEMS devices to be fabricated on semiconductor substrates, typically silicon substrates. These MEMS devices typically have sizes in the order of microns and may be integrated with other electrical circuits on a common substrate. As a result, MEMS devices have found their way into numerous applications across numerous industries. Exemplary MEMS applications include optical switching, optical attenuators, inertial or pressure sensors, and biomedical devices.

Generally, a MEMS optical switch has a mirror that can be extended and retracted in various positions. In one instance, the mirror can be extended to interpose between optical channels such that optical beams traveled in the channels are reflected. In another instance, the mirror can be retracted to be away from the optical channels such that optical beams traveled in the channels pass through without being reflected. Accordingly, depending on the position of the mirror, the optical beams can be switched into different optical channels. Yet in a MEMS optical attenuator instance, the mirror can be extended in a position that a part of optical beams traveled in the channels are reflected, and a part of the optical beams traveled in the channels pass through without being reflected. Accordingly, depending on the position of the mirror, different attenuation of the optical beams can be arranged.

An exemplary MEMS optical switch is described in a co-pending U.S. patent application Ser. No. 09/372,265, filed Aug. 11, 1999, entitled "MICROELECTROMECHANICAL OPTICAL SWITCH AND METHOD OF MANUFACTURE THEREOF", now U.S. Pat. No. 6,229,640 commonly assigned to ADC Telecommunications, Inc., which is incorporated herewith by reference. Another exemplary MEMS optical switch is described in a co-pending U.S. patent application Ser. No. 09/768,723, filed Jan. 24, 2001, entitled "MEMS OPTICAL SWITCH ON A SINGLE CHIP AND METHOD", commonly assigned to ADC Telecommunications, Inc., which is incorporated herewith by reference.

In a typical MEMS device, a mirror is supported by a suspension structure, and an actuator drives the mirror into different positions depending on the polarity and amount of power applied to the actuator. Typically, when no power is applied to the actuator, the mirror is moved back to the original position by the force of the bent suspension structure caused by the power.

Position sensing in a MEMS optical switch becomes very important to monitor the switch's performance and to provide feedback in case of failure for switching controlling.

Therefore, improvements on monitoring switch's performance and control of MEMS optical switches are desired.

SUMMARY OF THE INVENTION

In accordance with this invention, the above and other problems were solved by providing a position sensing apparatus for sensing switching positions in a MEMS device.

In one embodiment of the present invention, the position sensing apparatus is provided in a MEMS device that includes a suspension structure, an actuator, and a support structure. The position sensing apparatus includes a first contact that is disposed on the suspension structure, a second contact that is coupled to the support structure, and an indicator that is coupled to one of the first and second contacts. When the first and second contacts are in contact with each other, the indicator provides a first signal. When the first and second contacts are not in contact, the indicator provides a second signal.

Still in one embodiment of the present invention, the first contact is disposed on the suspension structure that is moveable when power is applied to the actuator, and the second contact is disposed on a deflection beam. A first end of the deflection beam is mounted on the support structure, and a second end of the deflection beam is deflectable when the first contact contacts the second contact.

In another embodiment of the present invention, the suspension structure includes a spring, the first contact is disposed on the spring that is moveable when power is applied to the actuator, and the second contact is a stationary contact.

Further in one embodiment of the present invention, the first contact is electrically connected to a ground voltage or potential, and the second contact is electrically connected to a pre-set voltage. The indicator includes a resistor and a buffer. The second contact is electrically connected to a node between the resistor and the buffer. The other end of the resistor is connected to a voltage supply, and the other end of the buffer is an output of the indicator. The output of the indicator provides the first signal and the second signal.

Accordingly, when power is applied to the actuator, a mirror that is mounted on the suspension structure is switched to a first position, and meanwhile the first and second contacts are in contact with each other such that the indicator provides the first signal that indicates that the mirror is switched to the first position. When no power is applied to the actuator, the mirror is switched to a second position, and meanwhile the first and second contacts are not in contact such that the indicator provides the second signal that indicates that the mirror is switched to the second position. An operator can easily monitor the switching positions of the mirror within a MEMS device.

Yet in one embodiment of the present invention, the indicator includes a resistor and an exclusive-or logic gate. The second contact is electrically connected to a node between the resistor and a first input of the exclusive-or logic gate. The other end of the resistor is connected to a voltage supply, and a second input of the exclusive-or logic gate is connected to a node between a resistor divider. The resistor divider has a first resistor connected to the power applied to the actuator, and a second resistor connected to the ground voltage or potential. An output of the exclusive-or logic gate is an output of the indicator that provides the first signal and the second signal. Accordingly, an operator can easily monitor the switch's performance of a MEMS device and provide feedback in case of switching failure or errors of the MEMS device.

Additionally in one embodiment of the present invention, the contacts of the position sensing apparatus can be fabricated with the rest of a MEMS chip structure, and the indicator can be built in with an actuator driven circuit.

One of the advantages of the present invention is that it provides a simple, durable, and cost effective mechanism for monitoring the switch's performance of a MEMS device.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE PREFERRED EMBODIMENTS OF THE PRESENT INVENTION

The present invention provides for a position sensing apparatus for sensing switching positions in a MEMS device, such as a MEMS-based optical switch. It is appreciated that the position sensing apparatus in accordance with the present invention can be used in other MEMS-based devices, such as optical attenuators, relays, valves, etc. As an example, an 1×4 MEMS-based optical switch is illustrated and described. However, the present invention is not limited to the particular preferred embodiments illustrated.

In the following description of the preferred embodiments, reference is made to the accompanying drawings, which form a part hereof, and in which is shown by way of illustration several embodiments in which the invention may be practiced. It is to be understood that other embodiments may be utilized as structural changes and may be made without departing from the spirit and scope of the present invention.

Figure 1:
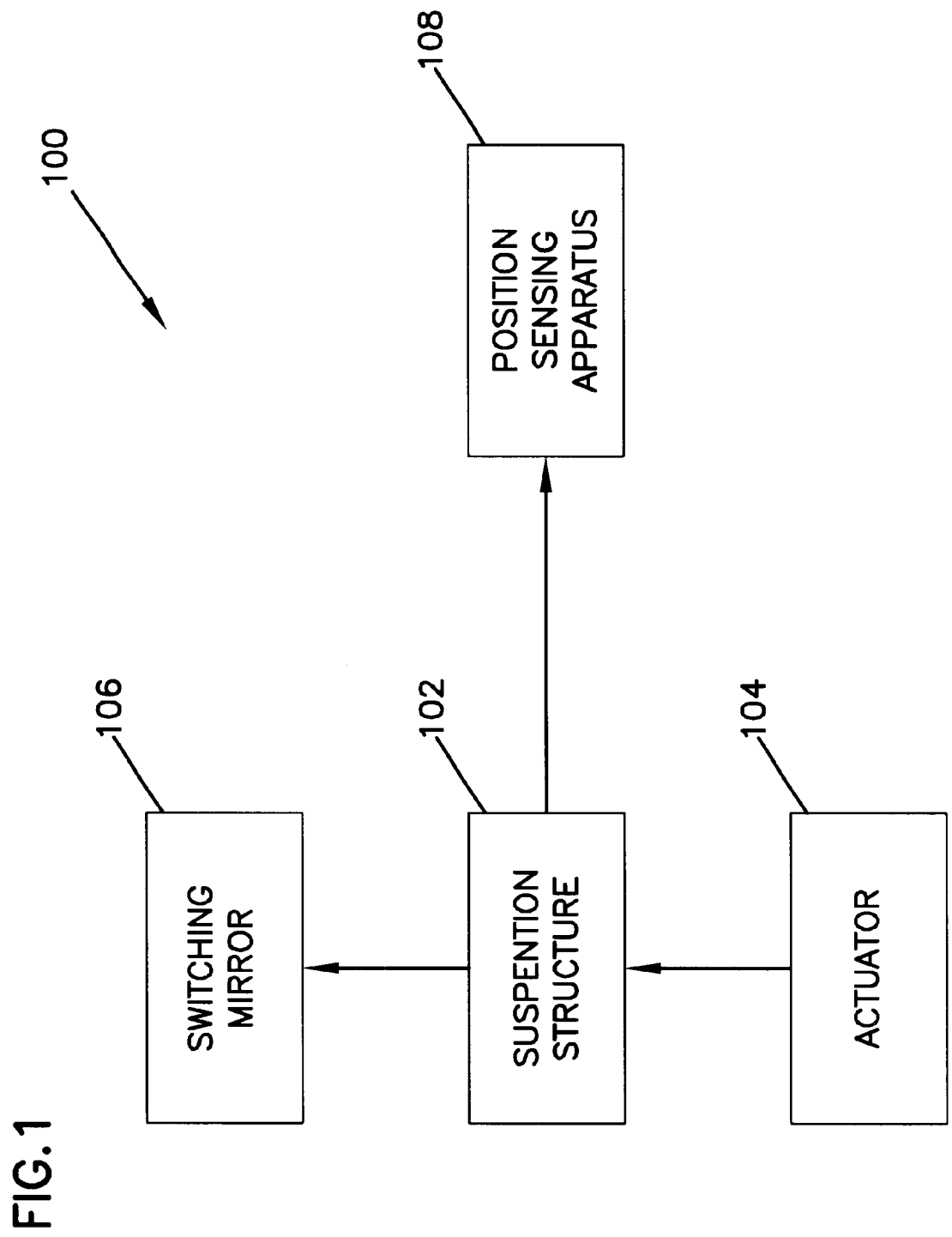
FIG. 1 is a block diagram of one embodiment of a MEMS optical switch having a position sensing apparatus in accordance with a preferred embodiment of the present invention.
Figure 2:
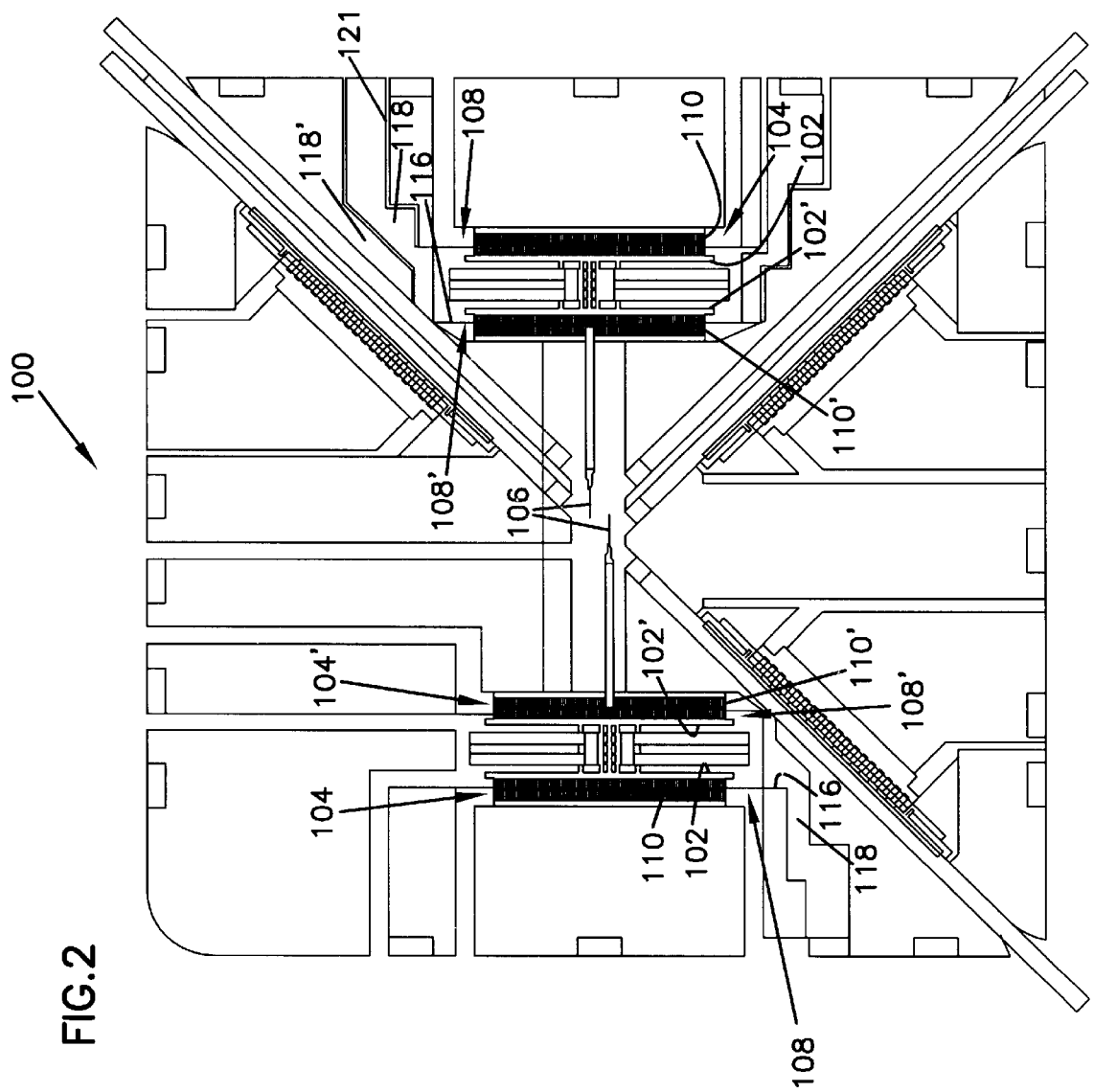
FIG. 2 is a schematic view of a 1×4 MEMS optical switch having the position sensing apparatus in accordance with a preferred embodiment of the present invention.
Figure 3:
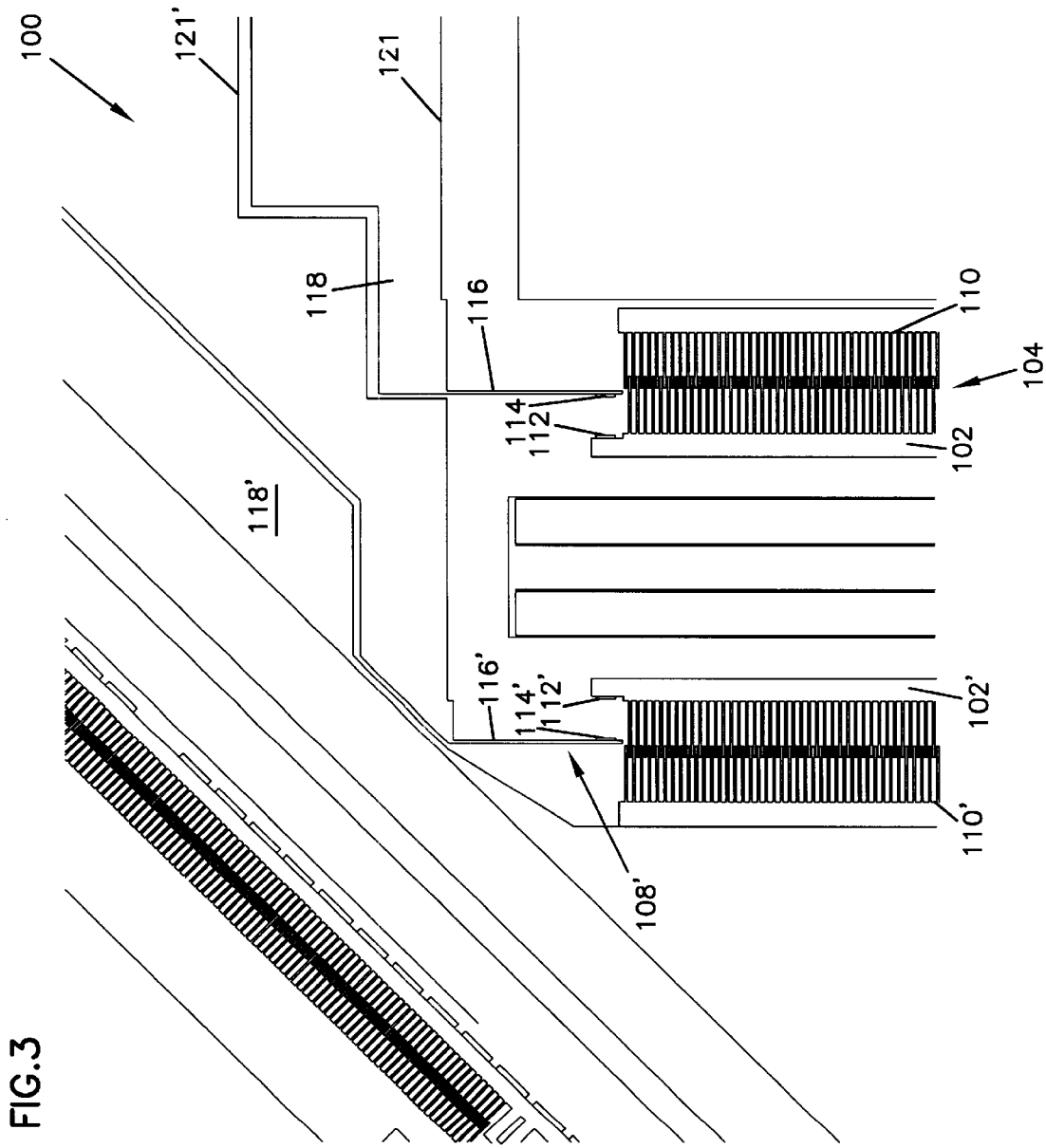
FIG. 3 is an enlarged schematic view of the position sensing apparatus of FIG. 2 when no power is applied to the actuator.
Figure 4:
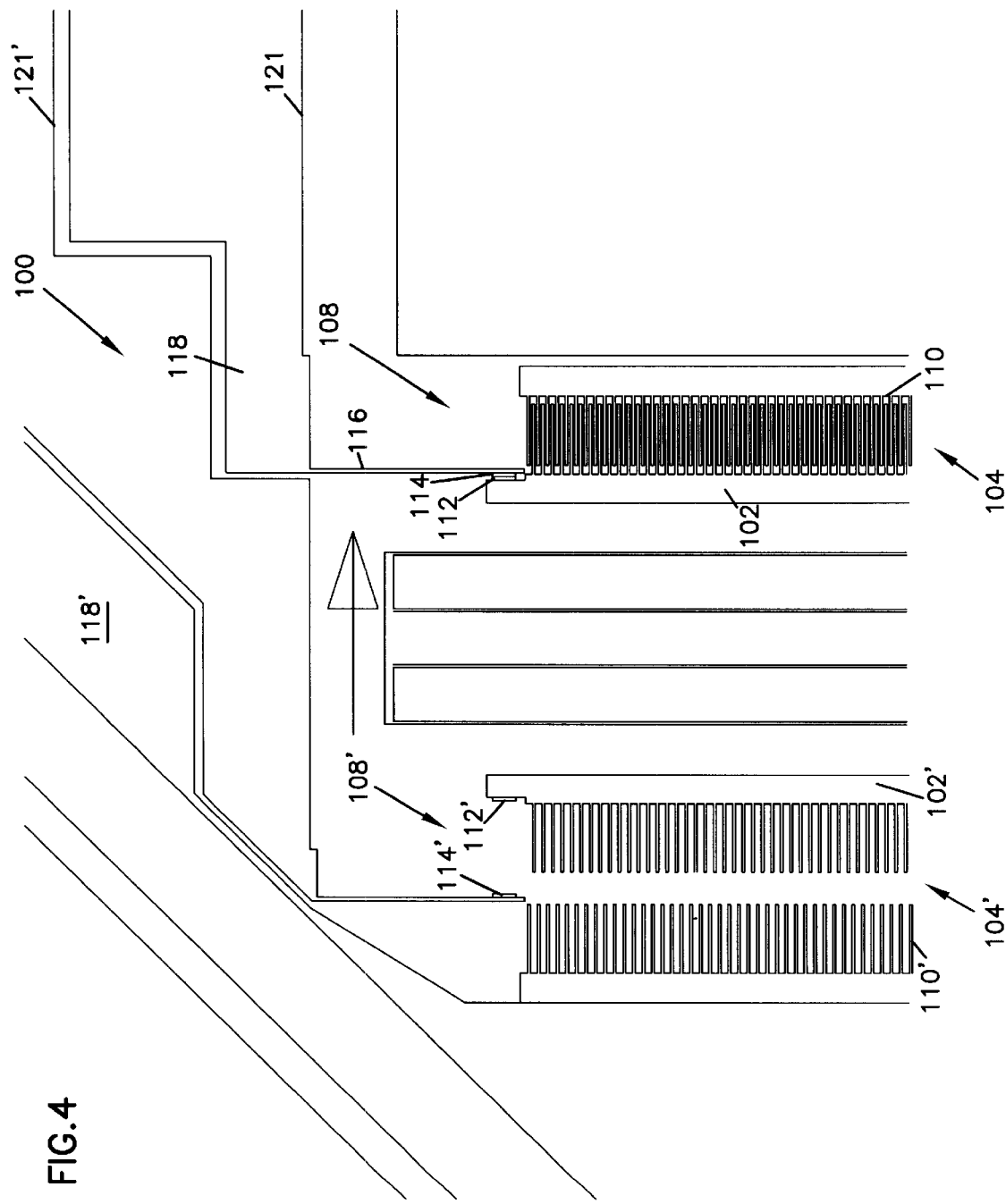
FIG. 4 is an enlarged schematic view of the position sensing apparatus of FIG. 2 when power is applied to an actuator.

Now referring to FIGS. 1–5, a MEMS optical switch 100 includes a suspension structure 102, an actuator 104, a switching mirror 106, and a position sensing apparatus 108. The switching mirror 106 is mounted on the suspension structure 102. To switch the optical switch 100, power is applied to the actuator 104. The actuator 104 includes a drive mechanism 110 capable of applying force which moves the suspension structure 102 and the mirror 106 to a first position, e.g. a retracted position as shown in FIG. 4. Meanwhile, the suspension structure 102 is deflected during the application of the force. The deflected suspension structure 102 returns the mirror 106 to a second position, e.g. the original position as shown in FIG. 3, in the absence of the application of force by the drive mechanism 110, i.e. no power is applied to the actuator 104.

Figure 5:
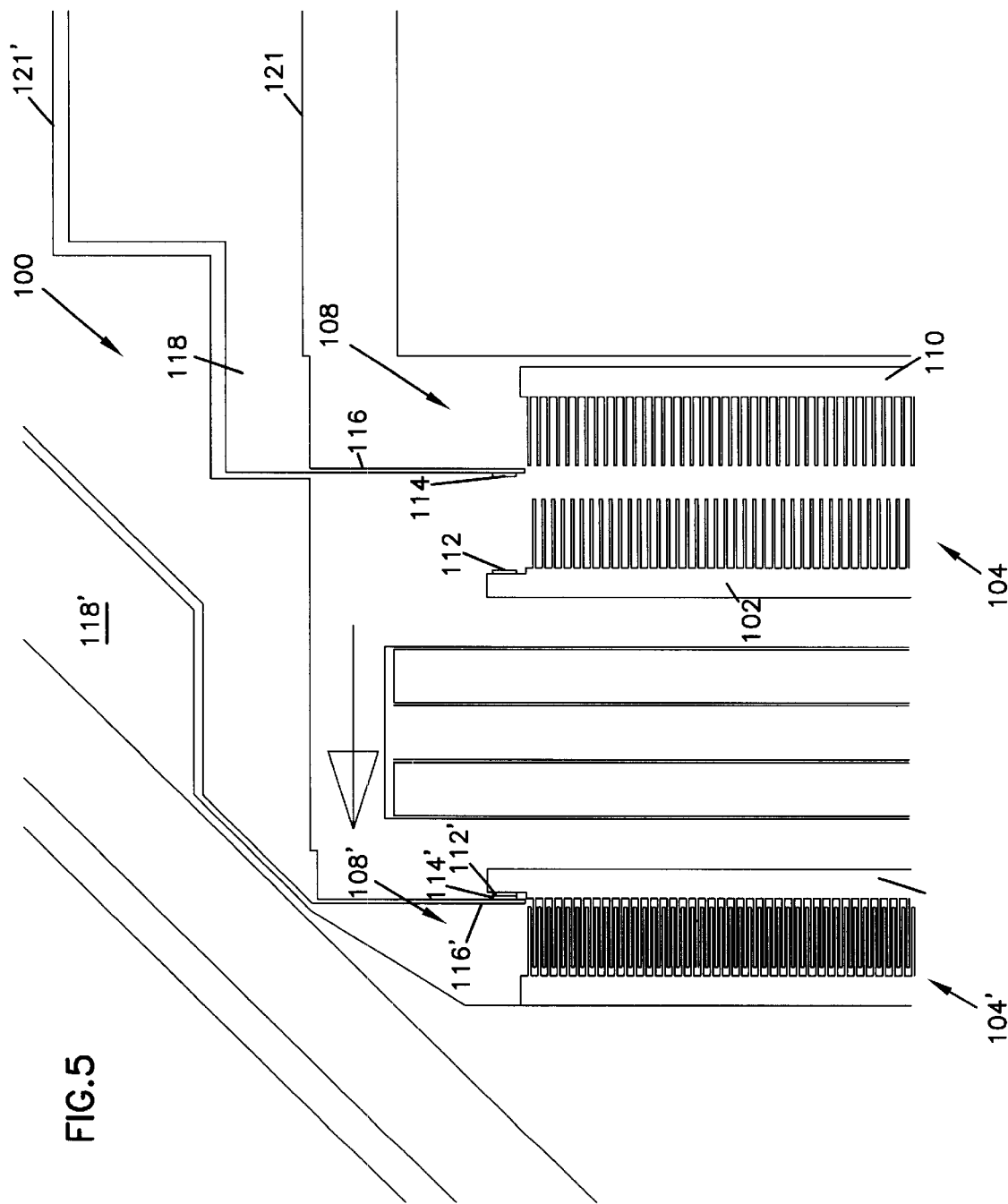
FIG. 5 is an enlarged schematic view of the position sensing apparatus of FIG. 2 when opposite power is applied to the actuator.

When the opposite power is applied to the actuator 104, the drive mechanism 110 applies force which moves the suspension structure 102 and the mirror 106 to a third position, e.g. an extended position as shown in FIG. 5. Meanwhile, the deflected suspension structure 102 is deflected during the application of the force. The deflected suspension structure 102 returns the mirror 106 to the second position, e.g. the original position as shown in FIG. 3, in the absence of the application of force by the drive mechanism 110, i.e. no power is applied to the actuator 104.

The detailed structures and operations of a MEMS optical switch have been described in a U.S. patent application Ser. No. 09/372,265, filed Aug. 11, 1999, entitled "MICRO-ELECTROMECHANICAL OPTICAL SWITCH AND METHOD OF MANUFACTURE THEREOF", now U.S. Pat. No. 6,229,640 commonly assigned to ADC Telecommunications, Inc., which is incorporated herewith by reference, or in a co-pending U.S. patent application Ser. No. 09/768,723, filed Jan. 24, 2001, entitled "MEMS OPTICAL SWITCH ON A SINGLE CHIP AND METHOD", commonly assigned to ADC Telecommunications, Inc., which is incorporated herewith by reference.

The position sensing apparatus 108 senses the different positions of the suspension structure 102. Since the mirror 106 is mounted on the suspension structure 102 and is moved with the suspension structure 102, the position sensing apparatus 108 also indicates the positions of the mirror 106. Accordingly, the present invention provides a mechanism to monitor the switch's performance of the mirror 106 and to allow feedback in case of failure for switching controlling within the MEMS optical switch.

FIG. 3 illustrates an enlarged schematic view of the position sensing apparatus 108. The position sensing apparatus 108 includes a first contact 112 being disposed on the suspension structure 102, and a second contact 114 being disposed on a deflection beam 116. The deflection beam 116 is supported by a support structure 118 of the MEMS optical switch 100. The apparatus 108 further includes an indicator 120 (shown in FIGS. 6 and 7). The first contact 112 is electrically connected to a ground voltage or potential. The second contact 114 is electrically connected to the indicator 120 via a conductive path 121 on the MEMS optical switch 100. When the first contact 112 and the second contact 114 come into contact with each other after power is applied to the actuator 104, the second contact 114 is also connected to the ground voltage or potential, and the indicator 120 outputs a first signal which indicates that the mirror 106 is in a retracted position. When the first contact 112 and the second contact 114 are not in contact with each other after power is removed, the second contact 114 is connected to a pre-set voltage (see discussion later in FIGS. 6 and 7), and the indicator 120 outputs a second signal which indicates that the mirror 106 is in the original position. The right arrow in FIG. 4 shows the direction of the force that the drive mechanism 110 applies to retract the mirror 106 when the power is applied to the actuator 104.

Also shown in FIGS. 3–5, the drive mechanism is a double comb drive mechanism such that when the opposite power is applied to the actuator as shown in FIG. 5, the drive mechanism forces the mirror 106 to an extended position. The left arrow in FIG. 5 shows the direction of the force that the drive mechanism applies to extend the mirror 106 when opposite power is applied. As shown, another position sensing apparatus 108' in accordance with the present invention can be implemented to monitor the extended position of the mirror 106. The other similar parts are numbered by the same reference numbers except with an addition of ('). It is appreciated that a single or double comb drive mechanism can be used without departing from the scope of the present invention. For the purpose of simplicity, the position sensing apparatus 108 is discussed in details.

Figure 6:
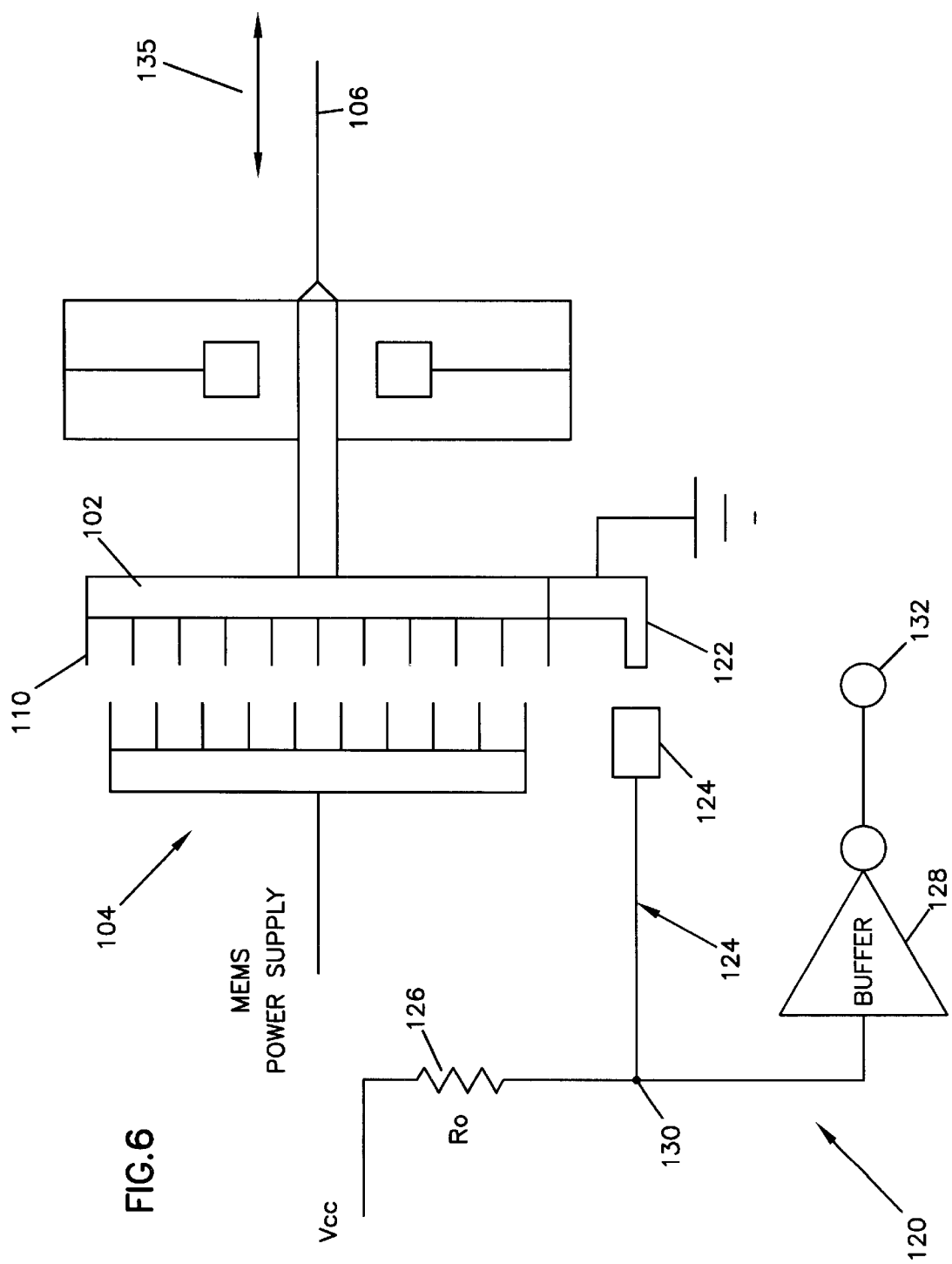
FIG. 6 is a schematic view of an indicator for indicating switching positions of a MEMS optical switch according to a preferred embodiment of the present invention.
Figure 7:
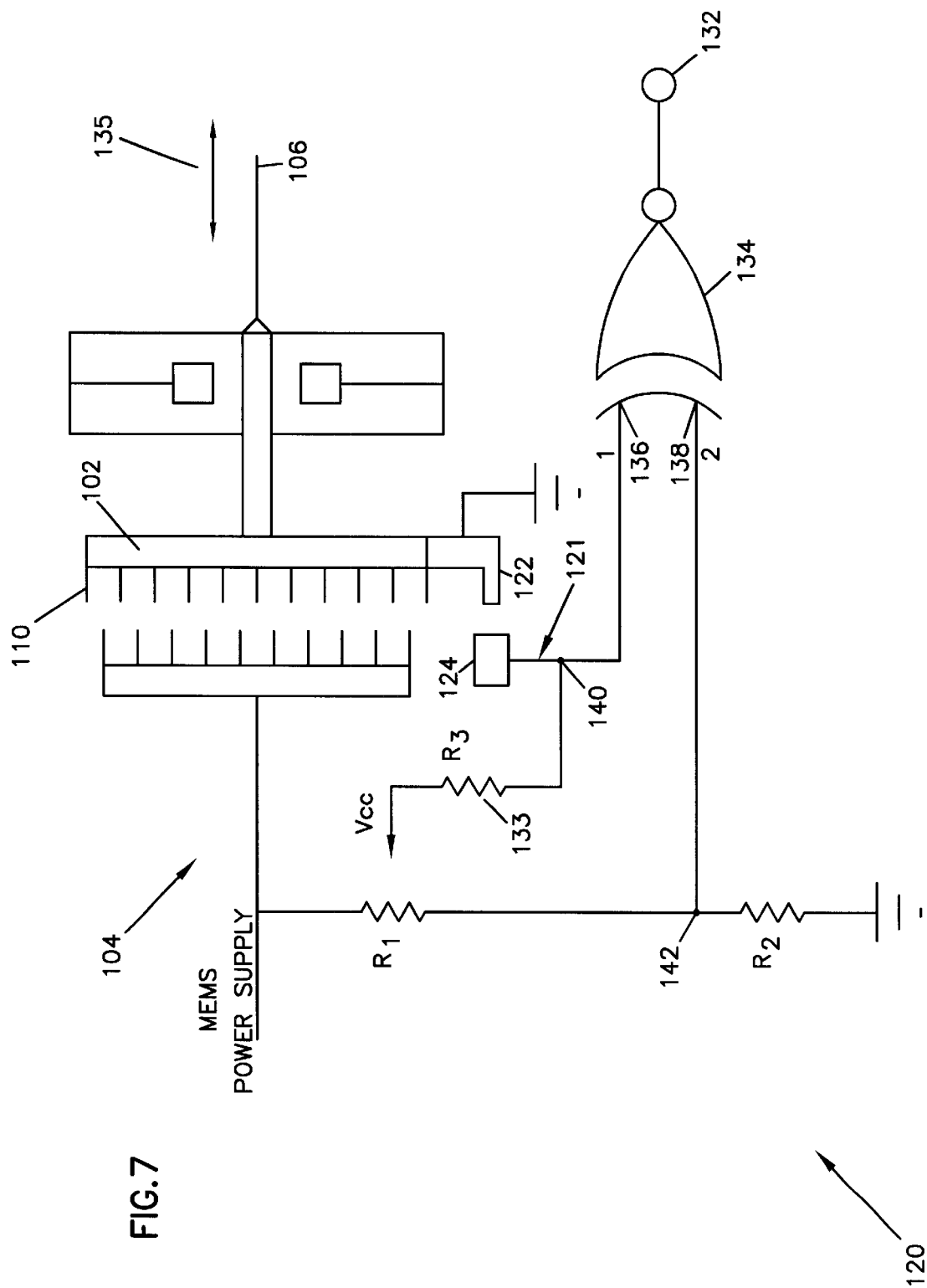
FIG. 7 is a schematic view of an indicator for indicating switching positions of a MEMS optical switch according to another preferred embodiment of the present invention.

It is appreciated that the contacts 112, 114 can be arranged and configured in other ways. In FIGS. 2–5, the first contact 112 is a contact pad mounted on the suspension structure 102, and the second contact 114 is a contact pad mounted on the deflection beam 116. In FIGS. 6 and 7, the first contact 112 is disposed on a spring 122 that is mounted on the suspension structure 102, and the second contact 114 is a stationary contact pad 124. The spring 122 is electrically grounded, and the contact pad 124 is electrically connected to the indicator 120.

In FIG. 6, one embodiment of the indicator 120 for indicating switching positions of the MEMS optical switch 100 is provided. The indicator 120 includes a resistor $R_0$ 126, preferably 100 KΩ, and a buffer 128. The second contact 124 is electrically connected to a node 130 between the resistor 126 and the buffer 128. The other end of the resistor 126 is connected to a voltage supply $V_{cc}$, preferably 5 volts, and the other end of the buffer 128 is an output 132 of the indicator 120. The output 132 of the indicator 120 provides the first signal whereby the power is applied to the actuator 104 and the second signal whereby no power is applied to the actuator 104.

Accordingly, when power applies to the actuator 104, the mirror 106 is switched to a first position, e.g. the retracted position, and meanwhile the first and second contacts 112, 114 are in contact with each other such that the indicator 120 provides the first signal that indicates that the mirror is switched to the first position. When no power applies to the actuator 104, the mirror 106 is switched to a second position, e.g. the original position, and meanwhile the first and second contacts 112, 114 are not in contact such that the indicator 120 provides the second signal that indicates that the mirror 106 is switched to the second position. The operator can easily monitor the switching positions of the mirror 106 within the MEMS optical switch 100.

As an example, in FIG. 6, when the mirror 106 is moved to the left as illustrated by an arrow 135, the indicator 120 outputs 0 volt. When the mirror 106 is moved to the right as illustrated by the arrow 135, the indicator 120 outputs 5 volts.

In FIG. 7, the indicator 120 is arranged and configured such that it can also sense the presence of the MEMS drive information. If this information is combined with the mirror position information, the output 132 of the indicator 120 can indicate position errors. As shown in FIG. 7, the indicator 120 includes a resistor R3 133 and an exclusive-or logic gate 134 having a first input 136 and a second input 138. The second contact 124 is electrically connected to a node 140 between the resistor 133 and the first input 136 of the exclusive-or logic gate 134. The other end of the resistor 133 is connected to a voltage supply $V_{CC}$, preferably 5 volts. The second input 138 of the exclusive-or logic gate 134 is connected to a node 142 between a resistor divider, i.e. R1 and R2, which reduces a MEMS power supply voltage to a logic level, preferably 5 volts. The first resistor R1 is connected to a MEMS power supply that is applied to the actuator 104, and the second resistor R2 is connected to the ground voltage or potential. An output of the exclusive-or logic gate 134 is the output 132 of the indicator 120 that provides the first signal and the second signal. Accordingly, an operator can easily monitor the switch's performance of the MEMS optical switch 100 and allow feedback in case of switching failure or errors of the MEMS optical switch 100.

As an example, in FIG. 7, when the power is applied, the mirror 106 is moved to the left as illustrated by the arrow 135. If the indicator 120 outputs 0 volt, the indicator 120 indicates that the mirror 106 is properly switched to the retracted position. If the indicator 120 outputs 5 volts, the indicator 120 indicates ERROR. Also, when no power is applied, the mirror 106 is moved to the right as illustrated by the arrow 135. If the indicator 120 outputs 5 volts, the indicator 120 indicates that the mirror 106 is properly switched to the original position. If the indicator 120 outputs 0 volt, the indicator 120 indicates ERROR. The following table is a logic table for the indicator 120 in FIG. 7 that not only provides mirror position information, but also feedbacks proper switching information.

| MEMS POWER ON/OFF | CONTACTS OPEN/CLOSE | INDICATOR OUTPUT | INDICATED INFORMATION |
|---|---|---|---|
| ON | OPEN | 5 volts | ERROR |
| ON | CLOSED | 0 volt | RETRACTED POSITION |
| OFF | OPEN | 5 volts | ORIGINAL POSITION |
| OFF | CLOSED | 0 volt | ERROR |

It is appreciated that the position sensing apparatus 108 can be implemented in many ways. For example, the contacts 112, 114 of the position sensing apparatus 108 can be fabricated with the rest of the MEMS chip structure, and the indicator 120 can be built in with an actuator driven circuit.

Having described the present invention in a preferred embodiment, modifications and equivalents may occur to one skilled in the art. It is intended that such modifications and equivalents shall be included within the scope of the claims which are appended hereto.

What is claimed is:

1. A position sensing apparatus for sensing switching positions in a MEMS device which as a suspension structure, an actuator, and a support structure, the apparatus comprising:
   a first contact disposed on the suspension structure;
   a second contact coupled to the support structure; and
   an indicator coupled to one of the first and second contacts, wherein when the first and second contacts are in contact, the indicator provides a first indication, and when the first and second contacts are not in contact, the indicator provides a second indication.

2. The apparatus of claim 1, wherein the first contact is moved with the suspension structure when power is applied to the actuator, and the second contact is disposed on a deflection beam, the deflection beam having a first end and a second end, the first end of the deflection beam is mounted on the support structure, and the second end of the deflection beam is deflectable when the first contact contacts the second contact.

3. The apparatus of claim 1, wherein the suspension structure includes a spring, the first contact is disposed on the spring which is moveable when power is applied to the actuator, and the second contact is a stationary contact.

4. The apparatus of claim 2, wherein the first contact is electrically connected to a ground voltage, and the second contact is electrically connected to a pre-set voltage.

5. The apparatus of claim 4, wherein the indicator includes a resistor and a buffer, the second contact is electrically connected to a node between the resistor and the buffer, the other end of the resister is connected to a voltage supply, and the other end of the buffer is an output of the indicator, the output of the indicator provides the first indication and the second indication.

6. The apparatus of claim 4, wherein the indicator includes an exclusive-or logic gate, the second contact is electrically connected to a node between the resistor and a first input of the exclusive-or logic gate, the other end of the resistor is connected to a voltage supply, and a second input of the exclusive-or logic gate is connected to a node a first resistor and a second resistor, the other end of the first resistor is connected to the power applied to the actuator, and the other end of the second resistor is connected to the ground voltage, an output of the exclusive-or logic gate is an output of the indicator which provides the first indication and the second indication.

7. The apparatus of claim 3, wherein the first contact is electrically connected to a ground voltage, and the second contact is electrically connected to a pre-set voltage.

8. The apparatus of claim 7, wherein the indicator includes a resistor and a buffer, the second contact is electrically connected to a node between the resistor and the buffer, the other end of the resistor is connected to a voltage supply, and the other end of the buffer is an output of the indicator, the output of the indicator provides the first indication and the second indication.

9. The apparatus of claim 7, wherein the indicator includes an exclusive-or logic gate, the second contact is electrically connected to a node between the resistor and a first input of the exclusive-or logic gate, the other end of the resistor is connected to a voltage supply, and a second input of the exclusive-or logic gate is connected to a node between a first resistor and a second resistor, the other end of the first resistor is connected to the power applied to the actuator, and the other end of the second resistor is connected to the ground voltage, an output of the exclusive-or logic gate is an output of the indicator that provides the first indication and the second indication.

10. A MEMS device built on a chip, comprising:
a moveable structure;
a stationary structure;
a position sensing apparatus comprising:
   a first contact disposed on the moveable structure;
   a second contact coupled to the stationary structure; and
   an indicator coupled to one of the first and second contacts, wherein when the first and second contacts are in contact, the indicator provides a first indication, and when the first and second contacts are not in contact, the indicator provides a second indication.

11. The device of claim 10, wherein the indicator includes a resistor and a buffer, the second contact is electrically connected to a node between the resistor and the buffer, the other end of the resistor is connected to a voltage supply, and the other end of the buffer is an output of the indicator, the output of the indicator provides the first indication and the second indication.

12. The device of claim 10, wherein the indicator includes an exclusive-or logic gate, the second contact is electrically connected to a node between the resistor and a first input of the exclusive-or logic gate, the other end of the resistor is connected to a voltage supply, and a second input of the exclusive-or logic gate is connected to a node a first resistor and a second resistor, the other end of the first resistor is connected to power applied to the device, and the other end of the second resistor is connected to the ground voltage, an output of the exclusive-or logic gate is an output of the indicator which provides the first indication and the second indication.

13. A method of monitoring switching positions of a MEMS device that includes a suspension structure, an actuator, and a support structure, the method comprising the steps of:
applying power to the actuator to switch the device from a first position to a second position; and
indicating by an indicator that the device is switched to the second position.

14. The method of claim 13, wherein the step of indicating includes outputting a first signal at an output of a buffer.

15. The method of claim 13, further comprising the step of:
removing the power applied to the actuator to switch the device from the second position to the first position; and
indicating by the indicator that the device is switched to the first position.

16. The method of claim 15, wherein the step of indicating includes outputting a second signal at an output of a buffer.

17. A method of monitoring switching positions of a MEMS optical switch that includes a suspension structure, a mirror supported by the suspension structure, an actuator, and a support structure, the method comprising the steps of:
applying power to the actuator to switch the mirror from a first position to a second position; and
indicating by an indicator that the mirror is switched to the second position, the indicator including an exclusive-or logic gate.

18. The method of claim 17, wherein the step of indicating includes outputting a first signal at an output of the exclusive-or logic gate.

19. The method of claim 17, further comprising the step of:
removing the power applied to the actuator to switch the mirror from the second position to the first position; and
indicating by the indicator that the mirror is switched to the first position.

20. The method of claim 19, wherein the step of indicating includes outputting a second signal at an output of the exclusive-or logic gate.

21. An apparatus according to claim 1 wherein the first indication is a signal and the second indication is a lack of signal.

22. An apparatus according to claim 1 wherein the first indication is a lack of signal and the second indication is a signal.

23. A position sensing apparatus for sensing switching positions in an MEMS device which has a suspension structure and a support structure, wherein the suspension structure and the support structure move relative to one another from a first state to a second state and vice versa, the apparatus comprising:
a first contact disposed on the suspension structure;
a second contact disposed on the support structure;
one of the first and second contacts is coupled to ground and the other of the first and second contacts is coupled to a source of potential through a resistor;
a logical sensing device having an input coupled to a node comprised of the resistor and one of the first and second contacts; and an output which is operatively coupled to the source of potential through the resistor when the contacts are in a first opened state and is operatively coupled to ground when the first and second contacts are in a second closed state.

24. A position sensing apparatus comprising:

a first contact disposed on a suspension structure;

a second contact disposed on a support structure;

one of the first and second contacts coupled to a source of potential, and the other of the first and second contacts coupled to ground through a resistor;

a logical sensing device having an input coupled to a node comprised of the resistor and one of the first and second contacts; and an output operatively coupled to ground through the resistor when the first and second contacts are in a first open state and operatively coupled to the source of potential when the first and second contacts are in a second closed state.

25. A MEMS device built on a chip, comprising:

a moveable structure which is movable from a first state to a second state and vice versa;

a stationary structure;

a position sensing apparatus comprising:

a first contact disposed on the movable structure;

a second contact disposed on the stationary structure;

one of the first and second contacts is coupled to ground and the other of the first and second contacts is coupled to a source of potential through a resistor;

a logical sensing device having an input coupled to a node comprised of the resistor and one of the first and second contacts; and an output which is operatively coupled to the source of potential when the first and second contacts are in an open state and is operatively coupled to the source of potential when the first and second contacts are in a closed state.

26. A MEMS device built on a chip, comprising:

a first contact disposed on a suspension structure;

a second contact disposed on a support structure;

one of the first and second contacts is coupled to a source of potential, and the other of the first and second contacts is coupled to ground through a resistor;

a logical sensing device having an input coupled to a node comprised of the resistor and one of the first and second contacts; and an output operatively coupled to ground through the resistor when the first and second contacts are in a first open state and operatively coupled to the source of potential when the first and second contacts are in a second closed state.

* * * * *

UNITED STATES PATENT AND TRADEMARK OFFICE
CERTIFICATE OF CORRECTION

PATENT NO.    : 6,459,524 B1
DATED         : October 1, 2002
INVENTOR(S)   : Zhang et al.

It is certified that error appears in the above-identified patent and that said Letters Patent is hereby corrected as shown below:

<u>Column 1,</u>
Line 11, "Modem" should read -- Modern --

Signed and Sealed this

Fourth Day of March, 2003

JAMES E. ROGAN
*Director of the United States Patent and Trademark Office*